Sept. 8, 1970  P. J. LONG, JR  3,527,451
SHOCK ABSORBER WITH PRESSURIZABLE RESERVOIR CHAMBER
Filed May 13, 1968  2 Sheets-Sheet 1

INVENTOR.
Paul J. Long, Jr.
BY
J. C. Evans
ATTORNEY

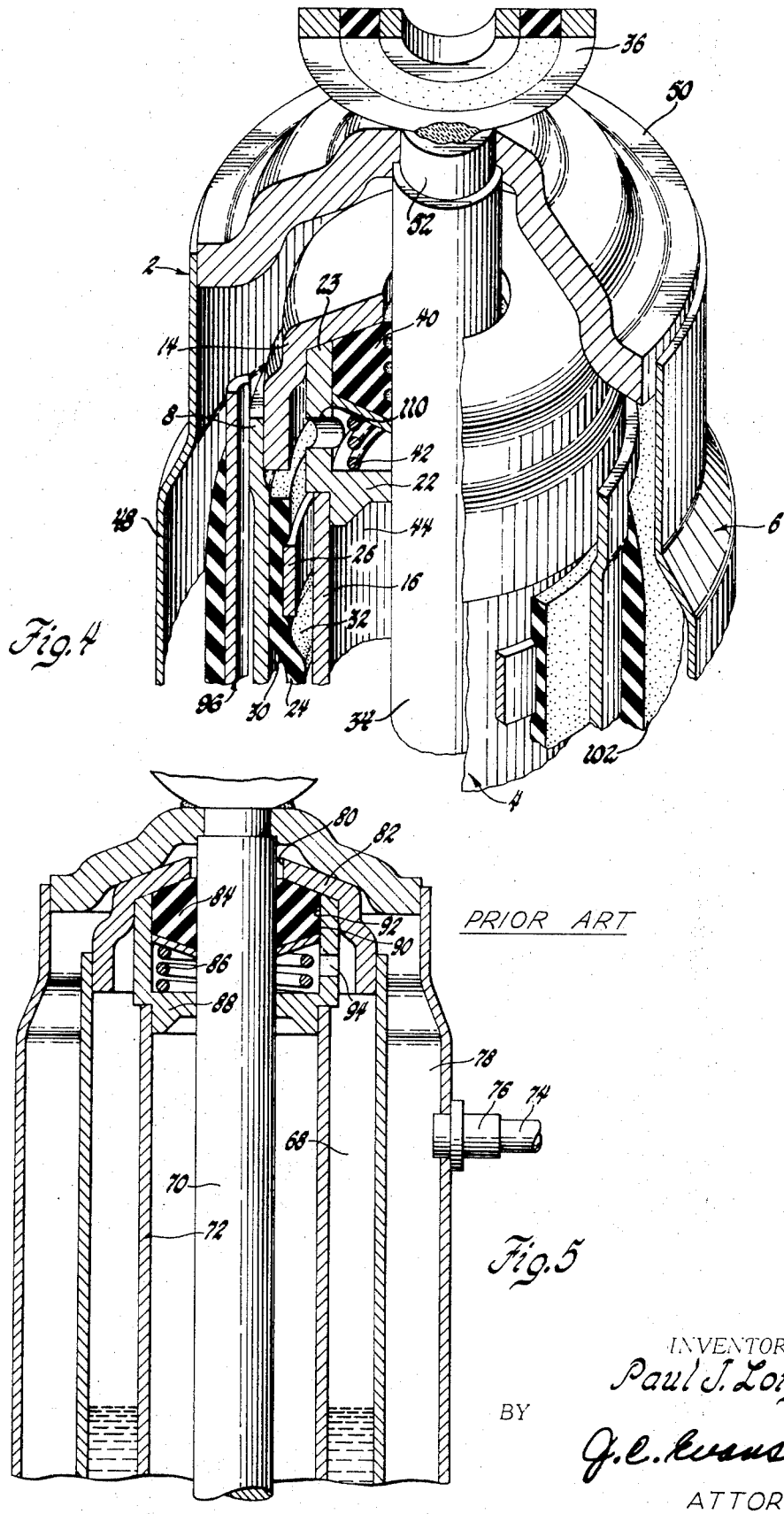

United States Patent Office 3,527,451
Patented Sept. 8, 1970

3,527,451
SHOCK ABSORBER WITH PRESSURIZABLE RESERVOIR CHAMBER
Paul J. Long, Jr., Dayton, Ohio, assignor to General Motors Corporation, Detroit, Mich., a corporation of Delaware
Filed May 13, 1968, Ser. No. 728,662
Int. Cl. B60g *11/26;* F16f *5/00*
U.S. Cl. 267—64      3 Claims

ABSTRACT OF THE DISCLOSURE

In preferred form, a shock absorber and air booster spring unit having a piston rod seal biased by a spring against the outer surface of a reciprocating piston rod. Pressurized air in an air spring chamber is vented to act on an elastic bladder that forms part of a fluid filled shock absorber reservoir chamber. In response to the force of pressurized air the bladder deforms and forces reservoir fluid against the piston rod seal in opposition to forces on the piston rod seal caused by direct contact with pressurized air from the air booster spring chamber. This balancing of forces precludes blow-by of pressurized air from the air booster spring chamber around the piston rod seal.

---

This invention relates to combination shock absorber and air booster spring assemblies and, more particularly, to such assemblies wherein a shock absorber piston rod extends through a pressurized air booster spring chamber and is contacted by a surrounding seal assembly to separate the shock absorber interior from the air booster spring chamber.

When shock absorber-air spring assemblies of the type disclosed in United States Pat. 3,063,701 are pressure tested, the air spring is inflated to approximately 150 p.s.i. This high pressure air pressing against a piston rod seal assembly causes a seal spring to collapse permitting pressurized air to leak into an air space above a hydraulic reservoir chamber. Later, during normal operation of the shock absorber, trapped pressurized air in the reservoir presses upon the piston rod seal causing undesirable wear.

An object of the present invention, therefore, is to prevent pressurized air in an air booster spring chamber from blowing by a piston rod seal and pressurizing the shock absorber interior thereby precluding undesirable friction between the seal and the piston rod during normal shock absorber operation caused by the force of pressurized air trapped within the shock absorber.

A further object is to improve combination shock absorber and air booster spring units for use in vehicular suspension level and dampening by the provision of an elastic bladder in the shock absorber that forms part of a hydraulic fluid filled reservoir, wherein the bladder expands to compensate for thermal expansion of the hydraulic fluid, wherein the bladder is associated with vent means to produce a reservoir hydraulic pressure commensurate to that in the air booster spring which acts to preclude high pressure air from blowing by the shock absorber piston rod seal into the reservoir chamber, wherein the bladder serves the additional function of retaining a shock absorber base valve completely submerged during operation of the unit in either a horizontal or vertical position.

In one working embodiment, the invention precludes blow-by around a shock absorber piston rod seal by the provision of means for counterbalancing fluid forces acting across the seal. The means include a reservoir in the unit completely filled with hydraulic fluid. A wall of this reservoir is formed by an elastic bladder that compensates for thermal expansion of the hydraulic fluid therein and which pressurizes the hydraulic fluid in accordance with pressure changes in the air booster spring.

More particularly, the counterbalancing means includes a vent tube for directing pressurized air from the air booster spring to press inwardly upon an elastic bladder which is coaxially located around a pressure cylinder tube in spaced relationship therewith to define an annular space. The annular space between the elastic bladder and the pressure cylinder tube defines the aforementioned reservoir. Pressurized air from the air booster spring directed through the vent tube contractively squeezes the bladder to pressurize the shock absorber hydraulic fluid to a like pressure level. Passageway means fluidly communicate the hydraulic fluid reservoir with one side of the piston rod seal. The hydraulic fluid presses against the seal via the passageway means to directly oppose blow-by of pressurized air from the air booster spring chamber.

Further objects and advantages of the present invention will be apparent from the following description, reference being had to the accompanying drawings wherein a preferred embodiment of the present invention is clearly shown.

In the drawings:

FIG. 1 is a vertical cross-sectional view of a shock absorber and air booster spring assembly incorporating features of this inveniton and shown in a partially extended position.

FIG. 2 is a horizontal cross-sectional view of a shock absorber and air booster spring assembly taken along lines 2—2 of FIG. 1 looking in the direction of the arrows to show the placement of vent tubes intercommunicating the air spring pressure chamber and the reservoir chamber.

FIG. 3 is an enlarged, fragmentary view in vertical section of the upper end of the unit in FIG. 1.

FIG. 4 is an enlarged, perspective view partially broken away of the upper end of the shock absorber and air booster spring assembly in FIG. 1.

FIG. 5 is a vertical cross-sectional view of an upper end portion of a prior art shock absorber-air spring assembly shown with an air space above a liquid level in the shock absorber reservoir chamber.

In FIG. 1 of the drawings, a shock absorber and air booster spring assembly 2 is illustrated. Assembly 2 basically includes a shock absorber portion 4 and an air booster spring portion 6. Assembly 2 is normally substituted for a conventional direct acting shock absorber and placed between the sprung mass and the unsprung mass of the vehicle adjacent the main suspension. The shock absorber portion 4 of assembly 2 will function in a normal manner to damp movement between the sprung mass and the unsprung mass of the vehicle relative to one another independent of the air spring portion 6. Pressurization of the air spring portion 6 of assembly 2 with a fluid such as air or other suitable gas will supplement the primary suspension spring support of the sprung mass of the vehicle on the unsprung mass. Thus, the vehicle can be maintained level even when it is heavily loaded.

The shock absorber portion 4 of assembly 2 includes an outer reservoir tube 8. A circular cup-shaped bottom end cap 10 securely fits within and encloses the bottom end of reservoir tube 8. The juncture between reservoir tube 8 and end cap 10 is a fluid tight fixed connection. A fitting 12 attached to the exterior surface of end cap 10 is adapted to secure the shock absorber and air booster spring assembly 2 to the unsprung mass of the vehicle.

The top end of reservoir tube 8 is attached to an inverted cup-shaped top end cap 14 by a fluid tight connection. Located concentrically within and in spaced relationship to reservoir tube 8 is a smaller diameter pressure cylinder tube 16. A base valve 18 is held within the bottom end of pressure cylinder tube 16 by a plurality of tabs 20 extending inwardly from the bottom end cap 10. An upright cup-shaped rod guide 22 closes the upper end of pressure cylinder tube 16. Upwardly extending sides 23 of the cup-shaped rod guide 22 are secured by the surrounding top end cap 14 to coaxially position the pressure cylinder tube 16 relative to reservoir tube 8. Rod guide 22 is axially held within the end of tube 16 by the end cap 14 which is attached to reservoir tube 8 in a fluid tight manner.

Disposed within the annular space between reservoir tube 8 and pressure cylinder tube 16 is a cylindrical elastic bladder 24 made of a material such as rubber. Bladder 24 is pressed outwardly at both ends into sealing engagement with the inner surface of reservoir tube 8 by rings 26 and 28 which further serve to fixedly secure the bladder in place. An annular enclosed expansion chamber 30 is formed between the reservoir tube 8 and bladder 24. A variable volume shock absorber reservoir chamber 32 is formed between bladder 24 and the outer surface of pressure cylinder tube 16.

Concentrically located within pressure cylinder tube 16 and extending through axially aligned bores within rod guide 22 and end cap 14 is a cylindrical piston rod 34. A top end of piston rod 34 which projects through end cap 14 is secured to a fitting 36 exteriorly of the shock absorber 4 adapted to secure the assembly 2 to the sprung mass of the vehicle. A valved piston 38, which is coaxially supported within pressure cylinder tube 16 for sliding reciprocal movement relative thereto, is attached to the lower end of piston rod 34. Relative movement between the sprung mass and the unsprung mass of the vehicle causes the interconnected piston rod 34 and piston 38 to reciprocate within the pressure cylinder tube 16. Sealingly encircling the piston rod 34 and supported within the hollow interior of cup-shaped rod guide 22 is a piston rod seal 40 made of a material such as rubber. Seal 40 is biased against the rod 34 and end cap 14 by a seal spring 42 which is compressed between a seal washer 43 in engagement with the base of seal 40 and rod guide 22. Piston rod seal 40 prevents leakage of hydraulic fluid from the shock absorber interior upon reciprocation of piston rod 34 within pressure cylinder tube 16. For a more detailed explanation of a piston rod seal of the type found in the preferred embodiment, reference is made to United States Pat. No. 2,643,147, it being understood that the details of the seal form no part of the present invention.

A variable volume rebound chamber 44 is formed within pressure cylinder tube 16 between rod guide 22 and valved piston 38. A variable volume compression chamber 46 is formed within pressure cylinder tube 16 between base valve 18 and valved piston 38. Both chamber 44 and chamber 46 are completely filled with hydraulic fluid during normal operation of the shock absorber. Movement of valved piston 38 within pressure cylinder tube 16 toward rod guide 22 necessarily decreases the volume of the rebound chamber 44. Likewise, movement of the valved piston 38 within pressure cylinder tube 16 toward base valve 18 decreases the volume of the compression chamber 46. Suitable valving (not shown) in piston 38 regulates flow between chambers 44 and 46 caused by reciprocation of piston 38 within pressure cylinder tube 16. The regulation of hydraulic flow produces a predetermined dampening of relative movement between sprung and unsprung masses of the associated vehicle. For a more detailed explanation of a valved piston of the type found in the preferred embodiment, reference is made to U.S. Pat. No. 2,695,034, it being understood that the details of the piston valving form no part of the present invention and that the invention is equally suited for use with shock absorbers having plain pistons.

Movement of piston 38 upward toward rod guide 22 increases the volume of compression chamber 46 by a greater amount than it decreases the volume of rebound chamber 44. The axial dimensions change equally in either chamber; but because piston rod 38 occupies a substantial volume of the rebound chamber 44, it follows that upon movement of piston rod 34 downward within pressure cylinder tube 16 the decrease in compression chamber volume will be greater than the increase in rebound chamber volume. Likewise, on reverse piston rod movement the increase in compression chamber volume will be greater than the decrease in rebound chamber volume. The differential in each case equals the volume of the piston rod either entering or exiting the interior of pressure cylinder tube 16. Because of this volumetric inequality, a supplementary quantity of hydraulic fluid must be provided to supply fluid to the compression chamber 46 upon movement of the piston 38 upward in pressure cylinder tube 16 and means must be provided to accept excess fluid from compression chamber 46 upon movement of piston 38 downward within pressure cylinder tube 16. The reservoir chamber 32 performs this fluid supply function. The base valve 18 which is located between reservoir chamber 32 and compression chamber 46 regulates the flow of hydraulic fluid therebetween. Components (not shown) within base valve 18 permit hydraulic fluid from the reservoir chamber 32 to enter the compression chamber 46 upon movement of piston rod 34 outwardly of the pressure cylinder tube 16. Other components (not shown) within base valve 18 permit hydraulic fluid from the compression chamber 46 to flow into the reservoir chamber 32 upon movement of the piston 38 downward in pressure cylinder tube 16. For a more detailed explanation of the base valve 18, reference is made to U.S. Pat. No. 2,695,034, it being understood that the details of the valving form no part of the present invention but are merely representative of one suitable valving arrangement for controlling hydraulic fluid flow between pressure cylinder tube 16 and reservoir chamber 32.

The air booster spring portion 6 of assembly 2 includes a cylindrical dust shield 48 concentrically located around the reservoir tube 8. A circular disk-shaped cover 50 is secured within the upper end of dust shield 48 and is attached to piston rod 34 at a reduced diameter portion 52 of the piston rod 34. The juncture between the cover 50 and piston rod 34 and the juncture between cover 50 and dust shield 48 are fluid tight fixed connections. Attached to the lower end of dust shield 48 and coaxially extending around reservoir tube 8 is a cylindrical resilient sleeve 54 made from a material such as rubber. More particularly, the upper portion of sleeve 54 surrounds reservoir tube 8 and is fixed against the inner surface of reservoir tube 8 by a connecting band 56. The lower portion of sleeve 54 is turned back over itself and secured to the lower end of dust shield 48 by an inwardly pressed connecting band 58. The process of turning the lower end back over itself forms a return bend portion 60 within the resilient sleeve 54 which joins the upper portion of the sleeve 54 located around reservoir tube 8 with the lower portion of sleeve 54 attached to dust shield 48. The annular space enclosed by the dust shield 48, cylindrical sleeve 54 and cover 50 defines an air booster spring chamber 62. A fitting 64 on dust shield 48 connects the air booster spring chamber 62 with an air pressure source (not shown) through a conduit 66. When pressurized air from the pressure source enters the air booster spring chamber 62, the resulting air pressure therein causes the volume of the air booster spring chamber 62 to be enlarged by the elongation of assembly 2.

A prior art shock absorber-air spring assembly, illustrated in FIG. 5, includes an air space within the reservoir chamber 68 to accommodate the varying volume of hydraulic fluid contained therein. As previously explained in relation to the embodiment shown in FIG. 1, the fluid volume within reservoir chamber 68 varies because fluid must be supplied to the shock absorber compression chamber (not shown in FIG. 5) during reciprocation of a piston rod 70 within a pressure cylinder tube 72. During the testing stage, air compressed to pressure levels as high as 150 p.s.i. is injected through a conduit 74 and fitting 76 into an air spring chamber 78. This pressurized air flows through bore 80 within end cap 82 and bears against seal 84. Consequently, a large axial force presses downwardly against seal 84 which causes seal spring 86 to collapse. The resultant downward movement of seal 84 within the interior of rod guide 88 permits pressurized air to flow between the top surface of seal 84 and the inner surface of end cap 82. The outer annular surface 90 of seal 84 can then be distorted and pulled away from sidewall 92 of rod guide 88. After seal 84 is distorted, pressurized air enters the reservoir chamber 68 through a port 94 within rod guide 88. Later, when pressure within the air booster spring chamber 78 is reduced to a lower pressure level, the high pressure air trapped within the reservoir chamber 68 bears axially upward against seal 84 along with the spring 86. In a typical working embodiment the air booster spring chamber can be maintained at from 15 to 20 p.s.i. where an associated vehicle is not heavily loaded. In this case the primary suspension springs will maintain the vehicle substantially level. The force of the high pressure air and spring 86 upon seal 84 creates abnormal bearing pressure between seal 84 and piston rod 70. These abnormal bearing pressures can produce undesirable seal wear.

In accordance with certain principles of the present invention, the illustrated embodiment includes means by which such test pressurization of the shock absorber reservoir chamber is precluded. As can best be seen in FIGS. 2 through 4, the pressure precluding means include a plurality of vent tubes 96, constituting passageway means, located at spaced apart points around the upper end of reservoir tube 8. Each of the tubes 96 has a curved surface 98 with side edges held against the outer surface of reservoir tube 8 at 100 by an end extension 102 on the sleeve 54 that is arranged to axially overlap each of the tubes 96. As best seen in FIG. 2, each tube 96 hereby forms an axial opening 104 between itself and the outer surface of reservoir tube 8. Further, each tube 96 separates the extension 102 from the outer surface of reservoir tube 8 to form another axial opening 106. The lower end 108 of vent tube 96 is shaped as a ring with a small break which extends through reservoir tube 8 to fluidly communicate air booster spring chamber 62 with the expansion chamber 30 formed between reservoir tube 8 and elastic bladder 24. Pressurized air from air booster spring chamber 62 communicates through openings 104, 106 and chamber 30 with the outer surface of bladder 24. The forces produced by this pressurized air press radially inwardly against bladder 24. Consequently, hydraulic fluid which completely fills reservoir chamber 32 is pressurized between flexible bladder 24 and pressure cylinder tube 16. A port 110 which extends radially through the side 23 of cup-shaped rod guide 22 directs this pressurized hydraulic fluid against the lower end of seal 40. The forces created by the pressurized hydraulic fluid bearing axially upward against the bottom end of seal 40 oppose and counterbalance downwardly directed forces upon seal 40 which are caused by direct contact with pressurized air from the air booster spring chamber 62. The pressurized air within the air booster spring chamber 62 communicates with the upper end of seal 40 through an axially directed bore 112 within the top end cap 14. Because the counterbalancing hydraulic force acting axially upward against the lower end of seal 40 is created by pressurized air from air booster spring chamber 32, this hydraulic force is equal in magnitude to the force on the upper end of seal 40 exerted by air from the air booster spring. A resultant cancellation of forces across the seal 40 prevents the collapse of seal spring 42, the distortion of seal 40 and the blow-by of pressurized air around seal 40 into reservoir chamber 32. Pressurization of the reservoir chamber 32 and the resultant high bearing pressures between seal 40 and piston rod 34 are eliminated by this pressure balancing means. Accordingly seal wear is reduced.

Another feature of the invention produced by virtue of the above described arrangement is that the combination shock absorber and air booster spring assembly can be operated in a horizontal attitude where its longitudinal axis is located in a horizontal plane. With units having air space to compensate thermal expansion as per the assembly in FIG. 5, such operation is precluded since the base valve of the shock absorber in such units could not remain sufficiently submerged to assure continuously effective dampening action. However, with the present invention, which includes a fluid filled reservoir, the base valve is always submerged to assure continuous damping. This is in part due to the inclusion of bladder 24 that also functions to balance air booster pressures across piston rod seal 40.

While the embodiment of the present invention as herein described constitutes a preferred form, it is to be understood that other forms might be adapted.

What is claimed is as follows:

1. A shock absorber and air booster spring assembly comprising: a hydraulic direct acting shock absorber including a pressure cylinder tube; reciprocable piston means coaxially within the pressure cylinder tube for the regulation of hydraulic fluid flow therethrough; means including an elastic bladder located coaxially around the pressure cylinder tube to define a hydraulic reservoir chamber; hydraulic fluid completely filling said reservoir chamber; a reservoir tube coaxially around the bladder forming a space for thermal expansion of fluid in said fluid filled reservoir chamber; a piston rod coaxially within the pressure cylinder tube and extending axially outward from the pressure cylinder tube; a dual ended seal assembly sealing the periphery of said rod; means formed around the reservoir tube including a member connected to the piston rod exteriorly of the pressure cylinder tube for defining a pressurizable air booster spring chamber in direct communication with a first end of the dual ended seal assembly; passageway means through the reservoir tube for communicating the air booster spring chamber with the space formed between the elastic bladder and the reservoir tube to cause hydraulic fluid within the reservoir chamber to be pressurized in accordance with the pressure level in the air booster spring chamber; and means directing the pressurized hydraulic fluid against a second opposed end of said dual ended seal assembly for balancing the forces acting on the first end thereof pursuant to the direct communication between the seal assembly and the air booster spring chamber.

2. A shock absorber and air booster spring assembly comprising: a hydraulic direct acting shock absorber including a pressure cylinder tube; a valved reciprocable piston coaxially supported within the pressure cylinder tube; said valved piston dividing the pressure cylinder tube into a compression chamber and a rebound chamber and regulating the hydraulic fluid flow therebetween caused by reciprocation of the piston within the pressure cylinder tube; a cylindrical elastic bladder coaxially disposed around the pressure cylinder tube forming a reservoir chamber; hydraulic fluid completely filling said reservoir chamber; a reservoir tube coaxially surrounding and attached to said bladder to define a chamber for thermal expansion of hydraulic fluid in said reservoir chamber; a piston rod attached to said valved piston and extending axially outward from the pressure cylinder tube; and a dual ended seal assembly sealing the periphery of said rod; a cylindrical dust shield coaxially surrounding the reservoir tube; a cover attaching one end of the dust shield to the piston rod exteriorly of the pressure cylinder tube; a flexible tubular member having one end coaxially disposed around and secured to the reservoir tube; said tubular member having another end attached to the dust shield to define an air booster spring chamber between said reservoir tube and said dust shield in direct communication with a first end of the dual ended seal assembly; a vent tube attached to said reservoir tube, said tube having one end directed through said reservoir tube and another end within said air booster spring chamber for communicating the air booster spring chamber with the chamber formed between the elastic bladder and the reservoir tube to cause pressurized air from the air booster spring to press against the elastic bladder and pressurize the hydraulic fluid within the reservoir chamber in accordance with the pressure level in the air booster spring; passageway means directing the pressurized hydraulic fluid from the reservoir chamber against a second opposed side of said seal assembly for balancing the forces acting on the first side thereof pursuant to the direct communication between the seal assembly and the air booster spring chamber.

3. In a combination shock absorber and air booster spring assembly of the type including a pressure cylinder tube surrounded by a reservoir tube defining a hydraulic reservoir chamber around the pressure cylinder tube; a valved reciprocable piston slidably supported within the pressure cylinder tube and reciprocated therein by a piston rod extending axially outward from the pressure cylinder tube and sealed around its periphery by a dual ended seal assembly; means formed around the reservoir tube including a member connected to the piston rod exteriorly of the pressure cylinder tube for defining a pressurizable air booster spring chamber in direct communication with one end of the seal assembly; the improvement comprising: elastic bladder means coaxially interposed between the pressure cylinder tube and the reservoir tube; the bladder means forming an elastic wall of the hydraulic reservoir chamber to compensate for thermal expansion of hydraulic fluid completely filling the reservoir chamber; means forming an expansion chamber on one side of said bladder means; passageway means intercommunicating said expansion chamber with the air booster spring chamber to cause hydraulic fluid within the reservoir chamber to be pressurized in accordance with the pressure level in the air booster spring; means directing the pressurized hydraulic fluid against said seal assembly for balancing the forces acting thereon pursuant to the direct communication between the seal assembly and the air booster spring chamber.

References Cited

UNITED STATES PATENTS

| 3,046,001 | 7/1962 | Schultze | 267—64 |
| 3,447,644 | 6/1969 | Duckett | 188—88 |

JAMES B. MARBERT, Primary Examiner

U.S. Cl. X.R.

188—88